United States Patent Office.

JOHN S. KENYON AND LEWIS FOX, OF BALDWINSVILLE, NEW YORK.

Letters Patent No. 108,914, dated November 1, 1870.

IMPROVEMENT IN MINERAL PAINTS.

The Schedule referred to in these Letters Patent and making part of the same.

We, JOHN S KENYON and LEWIS FOX, both of Baldwinsville, in the county of Onondaga and State of New York, have invented a new and improved Mineral Paint, of which the following is a specification.

Our invention has for its object the production of a cheap and durable paint, and consists in combining the hereinafter-described mineral or earthy substance with linseed or other suitable oil.

The principal substance which we make use of in the formation of our improved paint is the substance known as "red-rock," found in the towns of Lysander and Van Buren, county of Onondaga and State of New York.

The above mineral is of a reddish-brown color, and is usually found in a comminuted state.

The paint is prepared by first grinding the red-rock, which is very easily done, and then mixing it with linseed or crude oil in the usual manner of mixing paints.

What we claim as our invention is—

The combination of the hereinbefore-described mineral substance, called red-rock, with linseed or other oil, substantially as and for the purposes set forth.

JOHN S. KENYON.
LEWIS FOX.

Witnesses:
ARTHUR T. ORVIS,
BRADFORD MILLER.